United States Patent [19]

Pittini et al.

[11] Patent Number: 4,644,559
[45] Date of Patent: Feb. 17, 1987

[54] PROCEDURE FOR CONTROLLING THE TYPE OF ARC IN AN ELECTRICAL FURNACE, AND ARC FURNACE WHICH EMPLOYS THE PROCEDURE

[75] Inventors: Andrea Pittini, Gemona Del Friuli; Gianni Gensini, Buia, both of Italy

[73] Assignee: Ferriere Nord SpA, Osoppo, Italy

[21] Appl. No.: 587,726

[22] Filed: Mar. 8, 1984

[30] Foreign Application Priority Data

Mar. 10, 1983 [IT] Italy .............................. 83350 A/83

[51] Int. Cl.$^4$ ............................................ H05B 7/148
[52] U.S. Cl. .................................... 373/104; 323/258
[58] Field of Search .................... 373/102, 104, 105; 323/255, 256, 257, 258, 208–211

[56] References Cited

U.S. PATENT DOCUMENTS 3,431,344 3/1969 Borrebach ........................ 373/105
3,660,583 5/1972 Takanasi ........................... 373/104

*Primary Examiner*—Roy N. Envall, Jr.
*Attorney, Agent, or Firm*—Wegner & Bretschneider

[57] ABSTRACT

This invention concerns a procedure for controlling the type of arc in an electrical furnace (F), which comprises the monitoring (R) of the short circuit power of the network line (L) during a period of inactivity of the arc, whereby the value thus monitored is processed (B) to determine a primary voltage (V) to be maintained at a transformer (T2) supplying the electrodes of the furnace (F), and whereby the processing (E) combines fixed parameters (P) and at least variable parameters relating to:
  pre-set conditions of the arc (S),
  conditions of a substation tap changer (VAR),
  and line parameters (C) including at least the state of connection of banks of capacitors (C1–C2).

The invention also concerns an arc furnace (F) which employs a procedure for controlling the type of arc according to the methods described herein.

34 Claims, 2 Drawing Figures

PROCEDURE FOR CONTROLLING THE TYPE OF ARC IN AN ELECTRICAL FURNACE, AND ARC FURNACE WHICH EMPLOYS THE PROCEDURE

This invention concerns a procedure for controlling the type of arc in an electrical furnace.

To be more exact, the invention concerns a procedure for controlling the type of arc in an electrical furnace, the procedure being intended to keep the type of arc as constant as possible in the presence of variations in the working conditions, and in particular, in the short circuit power of the network, in such a way as to obtain an optimum yield of the arc itself.

The invention concerns also an arc furnace which employs this procedure.

Various procedures for regulating arc furnaces are known.

Patent GB-A-No. 2,000,615 discloses a control system by which the values of characteristic parameters in the secondary circuit of the furnace transformer are measured and compared with values relative to a known balance.

Control of the balance of the phase powers is performed on the basis of such comparison by means of suitable algorithms.

This patent is based on concepts different from those of the present invention and does not take into account the line parameters.

Patent DE-A-No. 2,544,452 discloses a system by which the control of the primary voltage of the furnace is performed by acting on the tap changer of the furnace transformer. This system has the purpose of keeping an unchanged power factor equal to the optimum value of working of the arc.

The above patent is intended to exploit the whole power of the transformer in an optimum manner.

The measurement of secondary voltages and currents, phase by phase, is carried out, as also is the measurement of the primary voltages. Monitoring of the values of the latter measurement serves to decide whether or not to carry out corrective action by means of the tap changer of the furnace transformer, bearing in mind that, as is well known, the tap changer can be operated in discrete steps.

No measurement of the short circuit power of the network of of other parameters of the network is performed.

If an arc furnace is to work well, it needs a power of network which can even range from 30 to 50 times the transformer power.

These power levels are so high that, owing to fluctuations in the short circuit power of the network during the course of time (for instance, within the period of a day), the short circuit power may even be lower than the power required.

In any event, the fluctuations in the short circuit power are such as to cause uneven functioning as between one smelting and another unless suitable action is taken to regulate the characteristic parameters of the arc.

In fact, it is wished to keep the power at the arc as constant as possible during the varying conditions.

In the case of regulation of a furnace of a constant impedance type, this being the case to which we shall make explicit reference henceforward, this keeping of a constant power at the arc can be obtained by keeping the voltage at the arc (Va) within a given range which is deemed tolerable.

The voltage at the arc depends substantially on:
the short circuit power (P.c.c) of the network;
the no-load primary voltage (V) at the transformer;
some conditions which we shall call line parameters and which concern the connection, or otherwise, of banks of power factor correction capacitors, and also the functioning conditions of the transformers, such as impedance, or other characteristic values of the electrical supply line of the furnace.

In particular, the voltage at the arc (Va) depends directly on the primary voltage (V), and therefore action must be taken with regard to the primary voltage (V) in order to regulate the arc and therefore the voltage at the arc (Va) so as to keep the characteristics of the arc itself constant.

The regulation of the value of the primary voltage (V) can be carried out in steps by acting on the tap changer of the sub-station transformer.

So as to be able to determine the optimum value of V in order to have the required Va, the invention envisages the monitoring of the short circuit power (P.c.c) available in the network before proceeding with each smelting operation.

This monitoring can only be done during intervals in the working of the furnace between successive smeltings of intervals for maintenance, since the monitoring itself requires that the furnace should be stopped and that at least one known bank of capacitors should be opened, these capacitors in turn requiring times of some minutes for self-discharge.

The invention envisages the processing thereafter of the P.c.c data monitored, with account to be taken of the characteristic parameters of the furnace and network and also of the voltage at the arc (Va) which is pre-set, depending on the type of arc which it is wished to keep.

In each processing of data the primary voltage V is calculated, according to the invention, for various working conditions, namely:
 no-load;
 with one bank of capacitors disconnected, under load;
 with two banks of capacitors disconnected, under load.

The processing takes into account these different working conditions.

This enables the working of the arc to be suited to variations in the line parameters (connection, or otherwise, of the capacitors) which should become advisable during the running of the furnace.

The invention visualises that processing of data can be carried out several times during working whenever it is wished to vary the type of arc on the basis of evaluations suitable for the specific case in question.

If so, the value of the short circuit power (P.c.c) used in each processing carried out during the running of the furnace is kept constant and the same as that verified at the beginning of the operation of the furnace.

The invention is therefore embodied with a procedure for controlling the type of arc in an electrical furnace, which comprises the monitoring of the short circuit power of the network line during a period of inactivity of the arc, and by which the value thus monitored is processed to determine a primary voltage to be maintained at a transformer supplying the electrodes of the furnace, and by which the processing combines fixed parameters and at least variable parameters relating to:
- pre-set conditions of the arc,
- conditions of a substation tap changer and
- line parameters including at least the state of connection of banks of capacitors.

Furthermore, the invention is embodied with an arc furnace which employs a procedure for controlling the type of arc in accordance with the foregoing procedure.

We shall now describe the procedure of the invention with the help of the attached figures, wherein.

Figure 1:
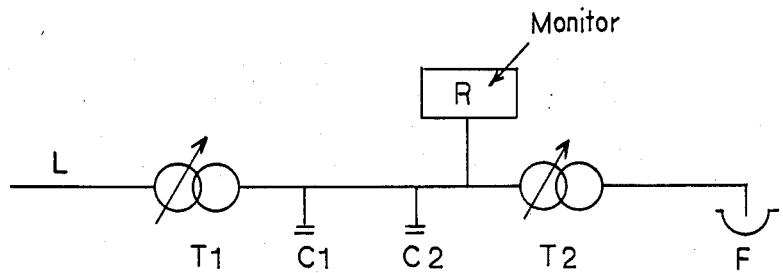
FIG. 1 is a diagram of the electricity supply of an arc smeling furnace.

In FIG. 1, L is an electricity supply line to which is connected the primary winding of a transformer T1. A second transformer T2 serves the furnace directly.

By acting on the tap changer of the transformer T1 it is possible to vary the primary voltage V of the transformer T2 and thereby the voltage of the arc Va in the furnace F.

Two banks of capacitors C1 and C2 for the power correction factor are positioned between the two transformers T1 and T2 in our example. At least one of these banks of capacitors is disconnected so as to proceed to determine the short circuit power P.c.c of the network.

The short circuit power P.c.c is determined with a measurement of voltage and, to be more exact, by measuring the difference between the primary no-load voltages with and without one or both of the banks of capacitors C1 and C2 (Ferranti effect).

As we said earlier, owing to the time needed for the self-discharge of the capacitors the disconnection of the capacitors for the measurement in question can only be done with the furnace stopped, that is to say, during tapping of the furnace for casting or during intervals for maintenance.

When the short circuit power P.c.c available has been measured, its value is taken as an invariant for the smelting carried out immediately thereafter.

This assumption of value is based on the fact that variations of the short circuit power P.c.c in the network are almost never sudden, because of the structures and kind of operation of the network itself.

It is therefore possible to assume, with an acceptable degree of error, that the short circuit power P.c.c found before a smelting operation is kept constant during that smelting.

In any event, when anomalous working conditions occur, it is possible to stop the running of the furnace, perhaps automatically, and then to carry out a new processing of data so as to adjust the running characteristics of the furnace to the unforeseen variations in the network.

In FIG. 1 the monitoring of the short circuit power P.c.c is symbolized with the block R.

Figure 2:
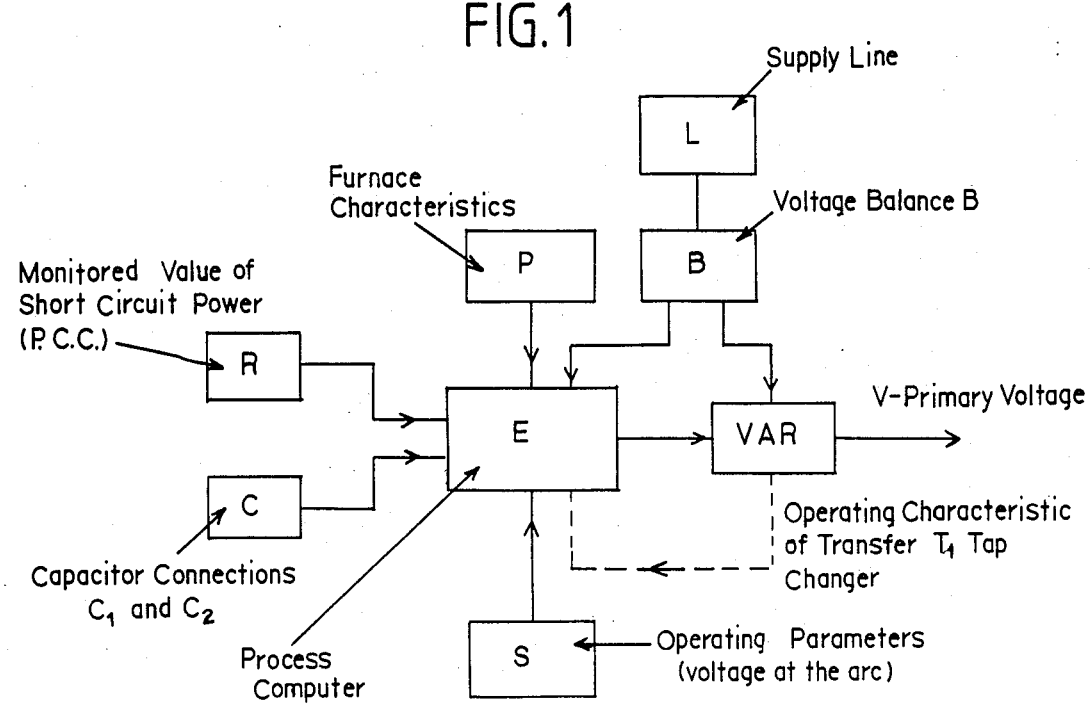
FIG. 2 is a block diagram of the control procedure of the invention.

The P.c.c data found are used for processing together with other parameters (FIG. 2).

The module E is a processing group which calculates the value of the optimum primary voltage V.

The processing group E receives as input data:
- the monitored value of P.c.c of the network (block R);
- the connection, or otherwise, of the banks of capacitors C1 and/or C2 and also any other line parameters (block C);
- some characteristic furnace parameters, which include the type of furnace operation, the level of the tap changer of the furnace, and the position of the current selector switch; which are fixed (block P); these parameters can be pre-set for the control cycle;
- some operating parameters which determine the type of arc required and, in particular, the voltgage at the arc Va required (block S); these parameters can be selected by the plant operator and can be varied, when so deemed opportune, for new data processing during the smelting, the other conditions remaining unaltered;
- information relating to the position and operating characteristic of the transformer tap changer VAR;
- information coming from the voltage balance B which checks to determine if the instantaneous reference signal existing at the time of the check is the same as or different from the signal read previously, which in turn is connected to the line L.

The data processing group takes these last two items of information into account as follows.

The transformer tap changer can act according to a characteristic with steps. Let us suppose, for example, that each step corresponds to a variation of x% of the primary voltage V, and let us assume an instantaneous value V1 of the primary voltage V.

An adjustment of one step up or down by the tap changer would entail a primary voltage of V1±x% respectively.

Let us assume that the voltage balance sends to the processing group E a signal that the tap changer VAR needs to be operated.

If the value of V which can be obtained with the operation of VAR is outside the field determined by the processing group E as being the optimum for the primary voltage V, the processing group E does not actuate the functioning of the tap changer VAR.

Instead, if it is possible to reach a value near enough to that calculated as being the optimum through one or more steps of the tap changer VAR, the processing group E actuates the functioning of the tap changer VAR.

It is possible in this way to obtain a primary voltage V always near to the optimum value calculated and therefore to obtain a voltage at the arc Va always near to the selected desired value.

In any event the processing group E takes into account any variations in the line parameters which may occur during the running of the furnace, such as the connection, or otherwise, of one or more banks of capacitors; and, as said earlier, the processing group E, while carrying out processing, arranges for various calculations suited to the various cases possible.

In this way the desired characteristics of the arc are kept during smelting or during the smelting phase for which the data processing has been performed.

We claim:

1. A process for controlling the type of arc in an electrical furnace to give a constant arc with optimum yield, comprising
    monitoring the short circuit power of the network line during a period of furnace inactivity of the arc to determine a value, and
    processing said value to determine a primary voltage to be maintained at a transformer supplying the electrodes of the furnace, said processing combining fixed parameters and at least one variable parameter relating to pre-set conditions of the arc, conditions of a substation voltage tap changer, and line parameters including at least the state of connection of banks of capacitors.

2. The process of claim 1, wherein said pre-set arc conditions include at least one variable at least correlated with the voltage at the arc.

3. The process of claim 1, wherein processing relating to the voltage tap changer takes place when a new value of primary voltage thus obtainable is closer to the optimum value calculated by the processing operation than the existing value.

4. The process of claim 2, wherein processing relating to the voltage tap charger takes place when a new value of primary voltage thus obtainable is closer to the optimum value calculated by the processing operation than the existing value.

5. The process of claim 1, wherein at least one processing operation is carried out before the running of the furnace.

6. The process of claim 2, wherein at least one processing operation is carried out before the running of the furnace.

7. The process of claim 3, wherein at least one processing operation is carried out before the running of the furnace.

8. The process of claim 4, wherein at least one processing operation is carried out before the running of the furnace.

9. The process of claim 1, wherein processing is carried out with parameters of arc selected as necessary during the running of the furnace and the value of short circuit power used in the processing is kept constant and the same as that monitored at the beginning of the process.

10. The process of claim 2, wherein processing is carried out with parameters of arc selected as necessary during the running of the furnace and the value of short circuit power used in the processing is kept constant and the same as that monitored at the beginning of the process.

11. The process of claim 3, wherein processing is carried out with parameters of arc selected as necessary during the running of the furnace and the value of short circuit power used in the processing is kept constant and the same as that monitored at the beginning of the process.

12. The process of claim 4, wherein processing is carried out with parameters of arc selected as necessary during the running of the furnace and the value of short circuit power used in the processing is kept constant and the same as that monitored at the beginning of the process.

13. The process of claim 5, wherein processing is carried out with parameters of arc selected as necessary during the running of the furnace and the value of short circuit power used in the processing is kept constant and the same as that monitored at the beginning of the process.

14. The process of claim 6, wherein processing is carried out with parameters of arc selected as necessary during the running of the furnace and the value of short circuit power used in the processing is kept constant and the same as that monitored at the beginning of the process.

15. The process of claim 7, wherein processing is carried out with parameters of arc selected as necessary during the running of the furnace and the value of short circuit power used in the processing is kept constant and the same as that monitored at the beginning of the process.

16. The process of claim 8, wherein processing is carried out with parameters of arc selected as necessary during the running of the furnace and the value of short circuit power used in the processing is kept constant and the same as that monitored at the beginning of the process.

17. The process of claim 1, wherein each factor in the processing includes calculations performed at least one possible parameter of the line.

18. In an arc furnace having a network line, a transformer, and an electrode, the improvement which comprises having means therein for controlling the type of arc, said arc-controlling means including means for monitoring the short circuit power of said network line and means for processing the monitored information to determine primary voltage at said transformer that supplies the electrodes of the furnace, said processing means including an evaluation of both fixed parameters and at least one variable parameter relating to pre-set conditions of the arc, condition of a substation voltage tap changer, and line parameters including at least the state of connection of banks of capacitors.

19. The arc furnace of claim 18, wherein said pre-set conditions of the arc are determined by at least one variable at least correlated to the voltage of the arc.

20. The process of claim 2, wherein each factor in the processing includes calculations performed for at least one possible parameter of the line.

21. The process of claim 3, wherein each factor in the processing includes calculations performed for at least one possible parameter of the line.

22. The process of claim 4, wherein each factor in the processing includes calculations performed for at least one possible parameter of the line.

23. The process of claim 5, wherein each factor in the processing includes calculations performed for at least one possible parameter of the line.

24. The process of claim 6, wherein each factor in the processing includes calculations performed for at least one possible parameter of the line.

25. The process of claim 7, wherein each factor in the processing includes calculations performed for at least one possible parameter of the line.

26. The process of claim 8, wherein each factor in the processing includes calculations performed for at least one possible parameter of the line.

27. The process of claim 9, wherein each factor in the processing includes calculations performed for at least one possible parameter of the line.

28. The process of claim 10, wherein each factor in the processing includes calculations performed for at least one possible parameter of the line.

29. The process of claim 11, wherein each factor in the processing includes calculations performed for at least one possible parameter of the line.

30. The process of claim 12, wherein each factor in the processing includes calculations performed for at least one possible parameter of the line.

31. The process of claim 13, wherein each factor in the processing includes calculations performed for at least one possible parameter of the line.

32. The process of claim 14, wherein each factor in the processing includes calculations performed for at least one possible parameter of the line.

33. The process of claim 15, wherein each factor in the processing includes calculations performed for at least one possible parameter of the line.

34. The process of claim 16, wherein each factor in the processing includes calculations performed for at least one possible parameter of the line.

* * * * *